M. G. BRISCOE.
DRIVING MECHANISM FOR DOUBLE EGG BEATERS.
APPLICATION FILED MAY 23, 1916.
1,233,748.
Patented July 17, 1917.
2 SHEETS—SHEET 2.
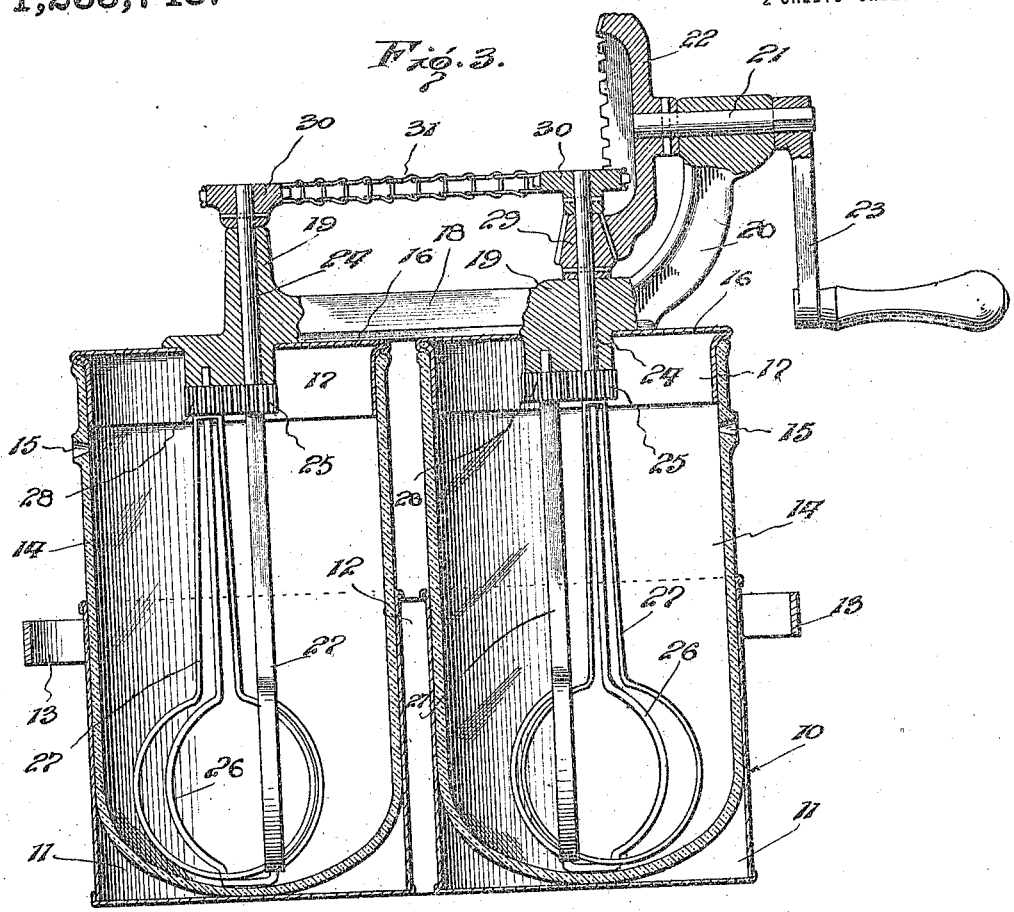
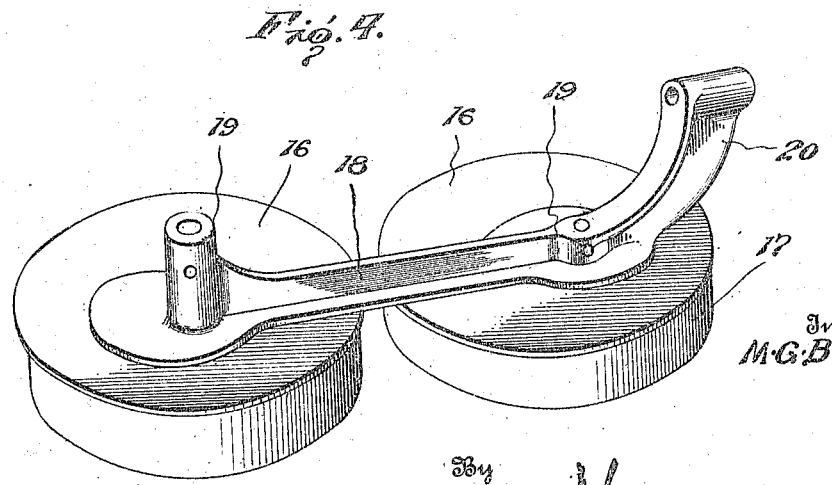
Inventor
M. G. Briscoe

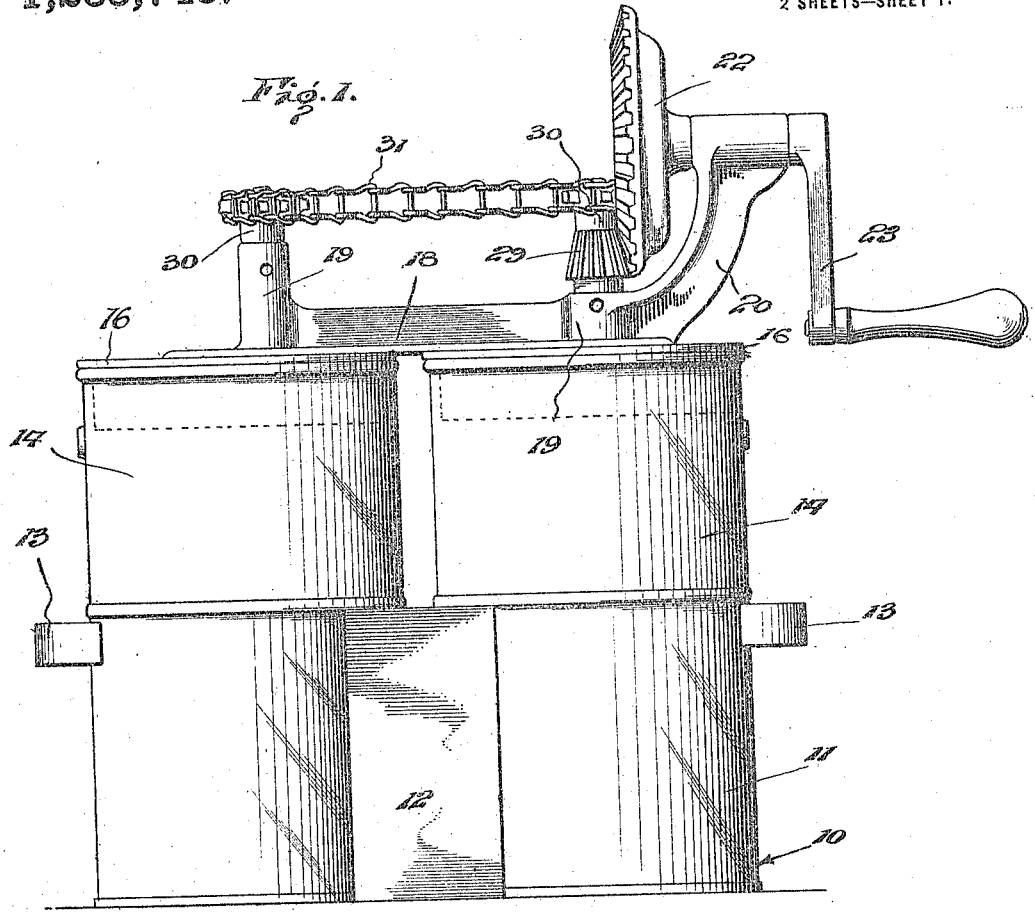
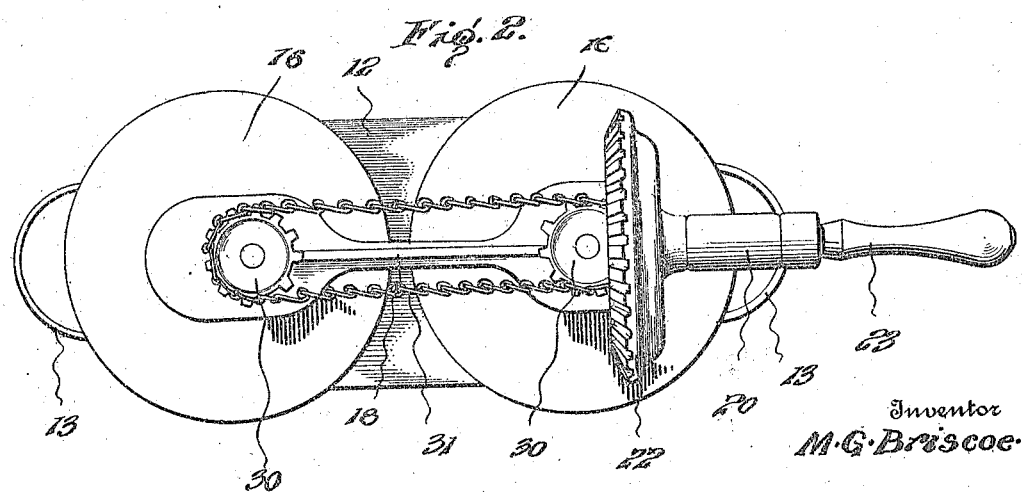

UNITED STATES PATENT OFFICE.

MARION G. BRISCOE, OF KNOXVILLE, TENNESSEE.

DRIVING MECHANISM FOR DOUBLE EGG-BEATERS.

1,233,748.

Specification of Letters Patent. Patented July 17, 1917.

Application filed May 23, 1916. Serial No. 99,367.

*To all whom it may concern:*

Be it known that I, MARION G. BRISCOE, a citizen of the United States, residing at Knoxville, in the county of Knox and State of Tennessee, have invented certain new and useful Improvements in Driving Mechanism for Double Egg-Beaters, of which the following is a specification.

This invention contemplates an improved double beater for beating eggs and the like and has as its primary object to provide a device of this character wherein the separated whites and yolks of the eggs may be beaten simultaneously.

The invention has as a further object to provide a device of this character employing coacting receptacles having lids therefor and wherein the said lids will be connected in proper spaced relation to fit into the open ends of the said receptacles by the mounting for the beating mechanism employed.

The invention has as a still further object to provide an improved base for supporting the receptacles in proper operative position and wherein the said receptacles may, when desired, be easily removed therefrom.

And a still further object of the invention is to provide an improved arrangement for operating the beaters whereby, through the manipulation of a crank, the beaters will be simultaneously rotated.

Other and incidental objects will appear as the description proceeds and in the drawings wherein I have illustrated the preferred embodiment of the invention and wherein similar reference characters designate corresponding parts throughout the several views, Figure 1 is a side elevation of my improved egg beater, Fig. 2 is a top plan view of the device, Fig. 3 is a sectional view more particularly showing the construction and mounting of the several elements of the beater, and Fig. 4 is a perspective view showing the lids for the receptacles of the beater and the manner in which the said lids are connected and supported in spaced relation by the mounting of the beating mechanism of the device.

In carrying out the invention, I employ a base 10 which includes spaced cups 11 arranged in substantially parallel relation and joined by a connecting web 12. The base 10 is preferably formed of metal although any other suitable material may be employed and is provided at opposite ends thereof with handles 13 which are secured to the cups 11.

Removably fitted within the cups 11 are coacting jars or beating receptacles 14 which are supported in substantially parallel spaced relation. The cups 14 are preferably formed of glass and adjacent the upper ends thereof, are provided with suitable openings or air vents 15. The inner ends of the receptacles are preferably of concavo-convex formation so that the said receptacles may be easily cleaned.

Closing the jars 14 are lids 16. These lids are preferably formed of suitable sheet metal and are provided with flanges 17 removably fitting into the open ends of the jars. Connecting the lids and supporting the said lids in proper spaced relation to fit within the jars is a bracket or bearing member 18 seating against the upper sides of the lids. The bearing member 18 is formed with spaced parallel bearings 19 arranged axially of the lids 16 and the inner ends of which project, as more particularly shown in Fig. 3 of the drawings, through the said lids. At one end, the said member is formed with an upstanding arm 20 which, at its outer extremity rotatably receives a horizontal shaft 21. Keyed or otherwise secured to the inner end of said shaft is a beveled pinion 22 while the outer end of the shaft is provided with a suitable crank 23.

Rotatably mounted in the bearings 19 of the brackets are beater shafts 24 which, at their inner ends, receive pinions 25. Extending axially into the receptacles 14 from the inner ends of the bearings 19, are beater frames 26 each of which rotatably supports coacting dashers 27 to provide a beater within each of the said receptacles. Corresponding dashers of the said beaters are connected at their upper extremities to the pinions 25 while the other dashers of the beaters are attached at their upper ends to pinions 28 rotatably supported by the frames 26 to coact with the pinions 25 with the said pinions abutting the inner ends of the bearings 19. As will be seen, rotation of the shafts 24 will cause the simultaneous rotation of the dashers 27.

The upper end of the bearing 19, adjacent the arm 20, is cut away to receive a beveled pinion 29 keyed or otherwise secured to the shaft 24 extending through the said bearing with the said pinion mounted to coöperate with the pinion 22 of the shaft 21. Mounted upon the upper ends of the shafts 24 and connected thereto in any suitable manner, are sprockets 30 around which is trained a sprocket chain 31. It will, therefore, be seen that by turning the crank 23, the beaters will be simultaneously operated through the medium of the said chain.

Attention is now directed to the fact that the bearing member 18 not only serves to support the beaters in proper operative relation but also provides a connecting member between the lids 16 so that the beating mechanism and the said lids constitute a complete unit which may be bodily displaced from the receptacles 14. Obviously, this provides a very convenient arrangement in the practical use of the device. In beating eggs, the yolks of the eggs may be placed within one vessel and the whites of the eggs in the other and the crank 23 operated to beat the separated whites and yolks at one operation. This operation completed, the lids 17 and the bearing mechanism may, as previously described, be removed and the receptacles 14 displaced from the cups 11 to be emptied of the contents thereof. During the beating operation, the vents 15 will supply sufficient air to the interior of the said receptacles.

Having thus described my invention, what I claim and desire to secure by Letters Patent is:

Driving mechanism for egg beaters comprising a bracket member having an upturned arm at one end, bearings on said member, shafts journaled in and extending through said bearings, rotary elements operatively connected with said shafts, sprockets on the upper ends of said shafts, a chain trained around said sprockets, a pinion on the shaft near the upturned arm below the sprocket thereon, a driving shaft journaled in the upper end of said arm, and a gear wheel on said shaft meshing with said pinion, said gear wheel being dished to pass around the adjacent sprocket.

In testimony whereof I affix my signature.

MARION G. BRISCOE. [L. S.]

Copies of this patent may be obtained for five cents each, by addressing the "Commissioner of Patents, Washington, D. C."